(12) United States Patent
Leung

(10) Patent No.: US 6,206,724 B1
(45) Date of Patent: *Mar. 27, 2001

(54) COMBINED CONNECTOR FOR ETHERNET AND MODEM CABLES

(76) Inventor: Tommy Y. Leung, 1841 Sterling Landing, San Jose, CA (US) 95131

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,903

(22) Filed: Jun. 6, 1997

(51) Int. Cl.$^7$ .................................................. H01R 13/60
(52) U.S. Cl. ......................................... 439/540.1; 439/638
(58) Field of Search .............................. 439/540.1, 638, 439/639, 607, 676, 101, 928, 928.1, 946, 79

(56) References Cited

U.S. PATENT DOCUMENTS

| | | | |
|---|---|---|---|
| 4,220,391 | * | 9/1980 | Kiolak et al. ..................... 439/540.1 |
| 5,407,366 | * | 4/1995 | Briones et al. ...................... 439/607 |
| 5,423,697 | * | 6/1995 | MacGregor .......................... 439/928 |
| 5,676,569 | * | 10/1997 | Davis ................................ 439/540.1 |
| 5,703,754 | * | 12/1997 | Hinze ................................. 439/946 |
| 5,773,332 | * | 6/1998 | Glad .................................. 439/946 |
| 5,820,414 | * | 10/1998 | Omori ................................ 439/946 |
| 5,954,523 | * | 9/1999 | Babcock ............................... 439/79 |

* cited by examiner

*Primary Examiner*—Paula Bradley
*Assistant Examiner*—Tho D. Ta

(57) ABSTRACT

An electrical connector device for multiple diverse electrical connectors is provided according to embodiments of the invention. The electrical connector device includes two female connectors in the same housing. The two female connectors are of different types and are oriented orthogonal to each other. The electrical connector device has a front face in which the openings to the two female connectors are located. The front face occupies the same space as another larger, standard electrical connector, thus allowing the electrical connector device to accommodate two separate connectors in the same space as a single standard connector, and thereby provide selective, simultaneous, independent, and dual functionality.

17 Claims, 1 Drawing Sheet

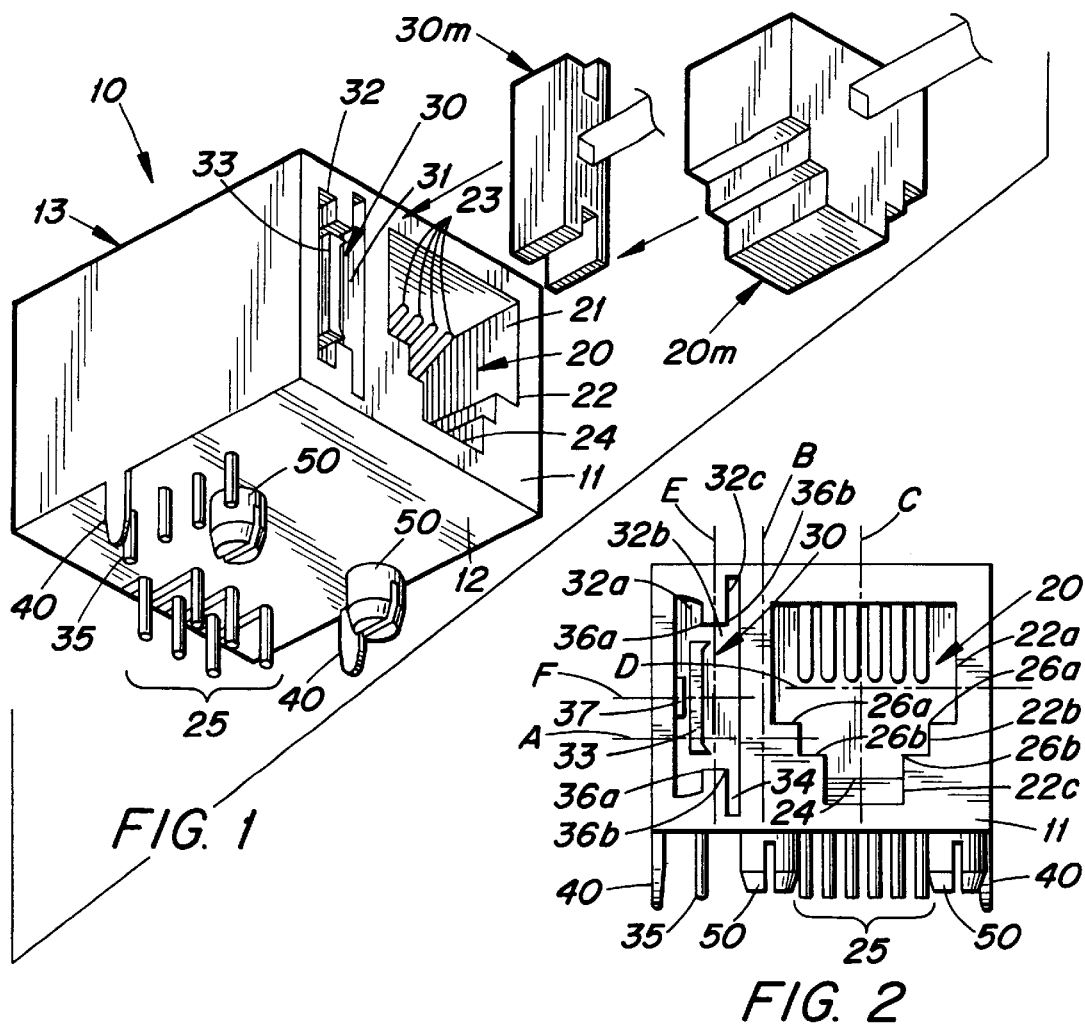
FIG. 1
FIG. 2
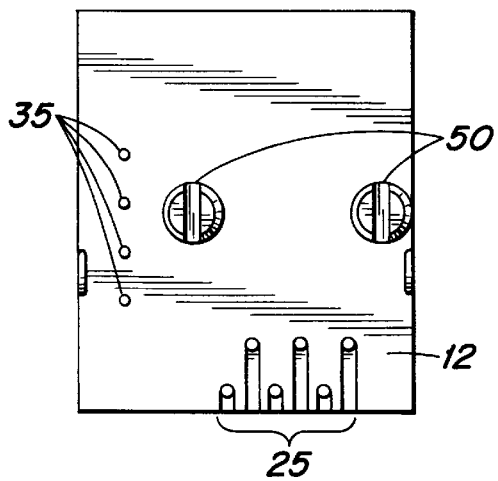
FIG. 3
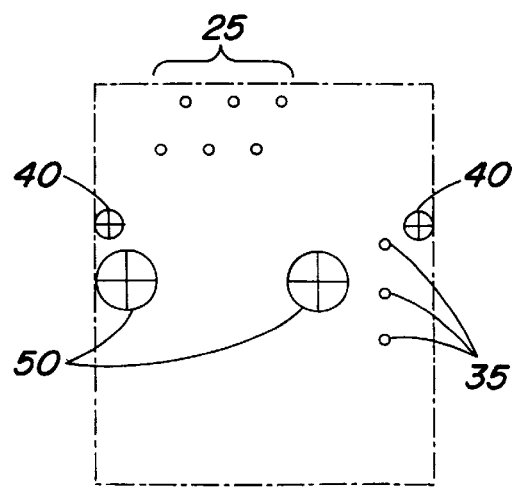
FIG. 4 ously along electrical conductors. Data signals require more than two electrical pathways. For example, data signals used in an ethernet require four electrical pathways to transmit along electrical conductors.

COMBINED CONNECTOR FOR ETHERNET AND MODEM CABLES

BACKGROUND OF THE INVENTION

1. Field of the Invention

The present invention relates generally to an electrical connection device and more particularly to an electrical connection device for connecting to plural electrical conductors.

2. Description of the Related Art

It is known in the art of electrical connectors that there are standard connector specifications which define, among other things, the size, shape, strength, and voltage and current capacity for specific electrical connector types. There are many different such specifications for the wide variety of electrical connectors which have been proposed.

It is known in the art of electrical connectors that particular uses for electrical connectors, such as for telephone and data transmission, define which type of connector is used for connecting several electrical devices. For example, when connecting several devices to transmit a telephone signal, one of several electrical connectors may be used. These include a standard RJ11 electrical connector and a standard RJ45 electrical connector. Similarly, when connecting several devices to transmit a data signal, it is possible to use one of several electrical connectors. These include a standard RJ45 electrical connector and a PCMCIA-type connector.

A standard male RJ11 connector is roughly cubical in shape, and includes a latching mechanism to secure the male RJ11 connector to a female RJ11 connector. The male RJ11 connector includes six (6) terminals for contacting a corresponding number of terminals in a female RJ11 connector, to establish six independent pathways. A female RJ11 connector includes a recess which is slightly larger than the male RJ11 connector, and of a similar shape, to accept a male RJ11 connector. A female RJ11 connector can include up to six (6) electrical terminals, which are physically arranged within the recess such that, when the male RJ11 is placed in the recess, the terminals in the recess of the female RJ11 are individually placed in physical contact with the four respective terminals of the male RJ11. The recess in the female RJ11 connector and the shape of the male RJ11 connector are such that there is only one orientation of the two which allows the two to mate, and thereby precludes connecting the terminals in any but a single way.

A male RJ11 connector may be connected to at least a first electrical conductor such that the first electrical conductor is in electrical communication with a first terminal of the male RJ11 connector. Similarly, a female RJ11 connector may be connected to at least a second electrical conductor such that the second electrical conductor is in electrical communication with a second terminal of the female RJ11 connector. To establish an electrical pathway between the first and second electrical conductors, the first terminal and the second terminal must be chosen such that they line up when the male RJ11 connector and the female RJ11 connector are joined. The male RJ11 connector is placed in the recess of the female RJ11 connector in the orientation dictated by the shape of the recess and the corresponding shape of the male RJ11 connector. The terminals of the male RJ11 connector line up with the terminal(s) of the female RJ11 connector. When the latching mechanism latches the male RJ11 connector to the female RJ11 connector, the respective terminals are in physical and electrical contact, thereby completing an electrical pathway between the at least first and the at least second electrical conductors. When more than one electrical pathway is desired, the desired number of electrical conductors are connected to terminals on the male and female RJ11 connectors.

A standard RJ45 connector is very similar to a standard RJ11 connector. One functional distinction between the two is that a standard RJ45 connector accommodates up to eight (8) electrical conductors by including eight terminals in a male RJ45 connector, and up to eight terminals in a female RJ45 connector. One physical distinction between the two is that a male RJ45 connector is somewhat larger than a male RJ11 connector; a female RJ45 connector is correspondingly larger than a female RJ11 connector.

Telephone signals require two electrical pathways to transmit along electrical conductors. Data signals require more than two electrical pathways. For example, data signals used in an ethernet require four electrical pathways to transmit along electrical conductors.

It is possible to place a male RJ11 connector in the recess of a female RJ45 connector, and establish up to six electrical pathways. It is therefore possible to use a female RJ45 connector for alternatively connecting both telephone and data signal devices through the use of RJ11 and RJ45 connectors, respectively. A limitation on this potential dual functionality of a female RJ45 connector is that both telephone and data signals cannot be accessed through the female RJ45 connector simultaneously, because both a male RJ11 connector and a male RJ45 connector will not physically fit in the recess of a female RJ45 connector.

Another limitation on the potential dual functionality of a female RJ45 connector is that a separate peripheral adapter, called a dongle, may be used to adapt a female RJ45 connector for accepting more than one type of male connector. While use of a dongle potentially allows access to all eight terminals of a female RJ45 connector, it must be added onto the female RJ45. A dongle therefore physically extends the female RJ45 connector, which may not be practical or desirable in many applications. A dongle also does not, in some applications, provide adequate electromagnetic shielding between its terminals.

Yet another limitation on this potential dual functionality of a female RJ45 connector is a threat of damage to the electrical devices intended to be connected. For example, if a telephone includes a male RJ45 connector, and an ethernet includes a female RJ45 connector, the male RJ45 connector may readily be inserted into the recess of the female RJ45 connector. This potentially exposes the telephone to electrical signals which it was not necessarily designed to accommodate, and exposes the ethernet to a load for which it was not necessarily designed. RJ45 connectors thus lack any shielding between diverse data signal type conductors, which further endangers electrical components connectable with them.

It is also known in the art of electrical connectors that when connecting several devices to transmit a data signal, one of several electrical connectors may be used. These include the numerous configurations of PCMCIA-type connectors. PCMCIA-type connectors generally carry four (4) terminals in the female PCMCIA-type connector which line up with four (4) terminals in a male PCMCIA-type connector. Although PCMCIA-type connectors do not all have the same physical configuration, they are characterized by a profile which can be long and thin, with the terminals spread out along the long axis of the connector.

SUMMARY OF THE INVENTION

The present invention, generally speaking, provides an improved electrical connector which includes both a standard electrical connector for a voice signal and an electrical connector for a data signal, for concurrent access to both signals.

Further the present invention provides an electrical connector device which includes two independent electrical connectors and which occupies the physical space of another single standard electrical connector, thereby enabling use of the improved electrical connector in applications which presently use only the single standard electrical connector. Thus, the present invention provides an electrical connector device that eliminates the need for the use of a dongle to adapt a standard eight pin electrical connector for dual functionality.

In a preferred embodiment, the present invention provides an electrical connector device that occupies the space of a female RJ45 connector and which includes a female RJ11 connector and a female PCMCIA-type connector, for allowing concurrent access to both a voice signal and a data signal through the improved electrical connector without threatening to damage electrical devices connected through the improved electrical connector by exposure to the wrong signal. Thus, the present invention provides an electrical connector device that allows simultaneous, and independent, access to both ethernet and telephone signals while only occupying the same physical space as a standard eight terminal electrical connector.

In a preferred embodiment, the present invention provides a connector for multiple diverse electrical conductors comprising a housing having a front face, a first connector having at least one electrically conductive terminal and at least one electrically conductive pin, the at least one electrically conductive pin in communication with the at least one electrically conductive terminal, the first connector defining an opening in the front face with a first orientation, a second connector having at least one electrically conductive terminal and at least one electrically conductive pin, the at least one electrically conductive pin in communication with the at least one electrically conductive terminal, the second connector defining an opening in the front face with a second orientation, the first orientation and the second orientation being mutually orthogonal.

In a preferred embodiment, the present invention also provides a method of using an electrical connector comprising providing a connector, attaching a first mating electrical connector to the first connector, attaching a second mating electrical connector to the second connector, the first mating electrical connector and the second mating electrical connector extending from the front face, conducting a first electrical signal through the first mating electrical connector to the first connector, and conducting a second electrical signal through the second mating electrical connector to the second connector.

BRIEF DESCRIPTION OF THE DRAWING FIGURES

The foregoing and other objects, features, and advantages of the present invention will be more readily understood upon reading the following detailed description in conjunction with the drawings, in which:

FIG. 1 is a perspective view of an electrical connector device according to an exemplary embodiment of the invention;

FIG. 2 is a front view of the electrical connector device of FIG. 1;

FIG. 3 is a bottom view of the electrical connector device of FIG. 1; and

FIG. 4 is a diagrammical view of the bottom of the electrical connector device of FIG. 1.

DETAILED DESCRIPTION OF THE PREFERRED EMBODIMENTS

In FIGS. 1 and 2, an electrical connector device 10 having a housing 13 includes a first connector 20 and a second connector 30. In these embodiments, connector 20 and connector 30 are shown to be of the female type. Electrical connector device 10 includes a face 11 and a bottom 12. Face 11 preferably is rectangle shaped, including a long axis A and a short axis B orthogonal thereto.

Connector 20, as shown in FIGS. 1 and 2, defines a recess 21 in electrical connector 10. Recess 21 defines opening 22 in face 11. Opening 22 has a horizontal or parallel orientation with respect to face 11. Connector 20 includes electrically conductive terminals 23 within recess 21. Opening 22, as illustrated in FIG. 2, has a height along vertical axis C and a width along horizontal axis D, and includes a first rectangular area 22a in which conductive terminals 23 are located. The rectangular area 22a includes a long axis (not shown) and a short axis (not shown) orthogonal thereto. Opening 22 further includes areas 22b, 22c, as best illustrated in FIG. 2, adjacent to and contiguous with area 22a. Areas 22a, 22b, and 22c define two sets of shoulders 26a, 26b. Shoulders 26a are defined between areas 22a and 22b. Shoulders 26b are defined between areas 22b and 22c. Shoulders 26a and 26b face in opposite directions, as illustrated in FIG. 2. Recess 21 also includes a portion 24 which mates with a correspondingly shaped latch mechanism (not shown) on a male connector 20m to retain the male connector in the connector 20, as discussed above.

Terminals 23 may be electrically conductive wires which are molded into the electrical connector device 10. In the embodiment shown in the figures, there are six (6) terminals. Terminals 23 are electrically connected to pins 25, which protrude from the bottom 12 of device 10, such that each terminal is in electrical communication with only one pin. In the embodiment shown in the figures, there are six (6) pins. For example, as illustrated in FIG. 2, the rightmost of terminals 23 can be connected to the rightmost of pins 25, the second of terminals 23 from the right can be connected to the second of pins 25 from the right, etc. Notably, as illustrated in FIG. 1, pins 25 may be not all in line with each other, to assist in attaching an electrical conductor (not shown) to each of the pins 25. For example, the first, third, and fifth pins may be collinear, and the second, fourth, and sixth pins may be collinear. Connector 20 may be of the "RJ11" type. Connector 20 may be used for modem and/or standard telephone connection.

As illustrated in FIGS. 1 and 2, connector 30 defines a recess 31 in electrical connector 10 and has a width along a vertical axis E and a height along horizontal axis F. Recess 31 defines opening 32 in face 11. Opening 32 has a vertical or orthogonal orientation with respect to face 11. Connector 30 is a thin, small profile connector, as illustrated in FIGS. 1 and 2. Connector 30 is mounted in device 10 vertical or orthogonal relative to connector 20. Connector 30 includes electrically conductive terminals 33 and a grounding tap 37 within recess 31. Opening 32, as illustrated in FIG. 2, includes a first rectangular area 32a in which conductive terminals 33 and grounding cap 37 are located. The rectangular area 32a includes a long axis (not shown) and a short axis (not shown) orthogonal thereto. Opening 32 further includes areas 32b, 32c, as best illustrated in FIG. 2, adjacent to and contiguous with area 32a. Areas 32a, 32b, and 32c define two sets of shoulders 36a, 36b. Shoulders 36a are defined between areas 32a and 32b. Shoulders 36b are defined between areas 32b and 32c. Shoulders 36a and 36b face in opposite directions, as illustrated in FIG. 2.

Recess 31 also includes portions 34 which mate with correspondingly shaped portions 30m on a male connector 20m to retain the male connector in the connector 30, as discussed above. Terminals 33 may be electrically conductive wires which are molded into the electrical connector device 10. In the embodiment shown in the figures, there are four (4) terminals. Terminals 33 are electrically connected to pins 35, which protrude from the bottom 12 of device 10, such that each terminal is in electrical communication with only one pin. In the embodiment shown in the figures, there are four (4) pins. For example, the highest of terminals 33, as illustrated in FIG. 3, can be connected to the highest of pins 35, as illustrated in FIG. 2; the second highest of terminals 33 can be connected to the second highest of pins 35, etc. Connector 30 is preferably surrounded with an electromagnetic interference (EMI) shielding member (not shown), which shields connector 30 from any EMI energy which may interfere with the operation of connector 30. The EMI shielding member may be incorporated into housing 13. The EMI shielding member is preferably constructed of a metal, although any material which effectively shields connector 30 from EMI energy may also be used, as would be readily apparent to one of ordinary skill in the art. Connector 30 may be very similar to a personal computer memory card interface adapter ("PCMCIA") type connector.

Recess 31 and opening 32 of connector 30 are oriented orthogonal relative to recess 21 and opening 22 of connector 20. This orthogonal orientation allows the device 10 to occupy much less space that other electrical connectors, as will be discussed in more detail below.

As best illustrated in FIGS. 1 and 2, bottom 11 also may include grounding pins 40, for connecting the device 10 to an electrical ground.

Bottom 12 may further include mounting pins 50 for mounting the device 10 to a personal computer motherboard or PCI slot in a personal computer. Housing 13 may be formed of any suitable material, such as nylon or an equivalent.

The overall dimensions of device 10, and particularly face 11 as illustrated in FIG. 2, are the same as that for a standard eight (8) terminal connector (not shown). One such eight terminal connector is a "RJ45" electrical connector. As discussed above, connector 20 and connector 30 are oriented at right angles to one another. In one embodiment of the invention, connector 30 is oriented vertically, and connector 20 is oriented horizontally. This allows the combination of the two discrete connectors 20, 30 to occupy much less physical space than if they were oriented in the same direction. Orienting connectors 20, 30 orthogonal to one another allows device 10 to present two discrete, independent connectors 20, 30 together in the same space as is occupied by a standard eight (8) terminal connector. Presenting two discrete connectors 20, 30 allows independent, selective, and simultaneous use of the two connectors 20, 30, which differs substantially from the use of a standard eight terminal connector, as discussed above, while presenting a face 11 which is substantially the same size as that of a standard eight terminal connector.

One application of the present invention is in a card (not shown) for use in a personal computer such as those manufactured by Apple Computer Company and International Business Machines Corporation. When a card has two independent functions, each of which requires a connector to send and receive electrical signals to and from the computer, each of the connectors 20, 30 may be used. Specifically, one of connectors 20, 30 may be used for one function of the card, the other of connectors 20, 30 may be used for the second function of the card. More specifically, when the card has circuitry (not shown) which provides both ethernet connectivity functionality and modem functionality, one of connectors 20, 30 may be used for ethernet connectivity and the other of connectors 20, 30 may be used for modem connectivity.

Even more specifically, connector 20 may be used for modem connectivity, and connector 30 may be used for ethernet connectivity. As the terminals 23 of connector 20 are electrically isolated from terminals 33 of connector 30, and correspondingly shaped male connectors (not shown) for each connector 20, 30 will not fit into recess 21, 31 of the other connector 20, 30, there is no threat whatsoever that the wrong kind of electrical signals will be conducted through each connector 20, 30. Because the two connectors 20, 30 are integrally incorporated into device 10, there is no need to provide a dongle to provide dual functionality within the space of an eight terminal connector.

While the invention has been described in detail with reference to specific embodiments thereof, it will be apparent to one skilled in the art that various changes and modification can be made, and equivalents employed, without departing from the spirit and scope of the invention.

What is claimed is:

1. A connector for multiple diverse electrical conductors comprising:

a housing having a front face including a height extending along a first axis and a width extending along a second axis, said housing first and second axes being orthogonal;

a first connector having at least one electrically conductive terminal and at least one electrically conductive pin, said at least one electrically conductive pin in communication with said at least one electrically conductive terminal, said first connector defining an opening in said front face, said first connector having a height extending along a first axis and a width less than said first connector height extending along a second axis, said first connector first and second axes being orthogonal;

a second connector having at least one electrically conductive terminal and at least one electrically conductive pin, said at least one electrically conductive pin in communication with said at least one electrically conductive terminal, said second connector defining an opening in said front face, said second connector having a height extending along a first axis and a width greater than said second connector height extending along a second axis, said second connector first and second axes being orthogonal;

wherein said first connector first axis is orthogonal to said second connector first axis and parallel to said front face first axis; and wherein said front face occupies an area and wherein said area is substantially the same as that occupied by a female RJ-45 connector.

2. The connector according to claim 1, wherein said first connector is a female connector.

3. The connector according to claim 1, wherein said second connector is a female connector.

4. The connector according to claim 1, wherein said first connector and said second connector are female connectors.

5. The connector according to claim 1, wherein said housing includes mounting lugs for mounting the connector to another device.

6. The connector according to claim 1, wherein said first connector has six terminals and six pins.

7. The connector according to claim 1, wherein said second connector has four terminals and four pins.

8. The connector according to claim 1, wherein said first connector is an RJ11-type connector and said second connector is a PCMCIA-type connector.

9. The connector according to claim 1, further comprising at least one grounding pin for grounding at least one of said first connector and said second connector.

10. The connector according to claim 1, wherein said first and said second connectors are mutually electrically insulated.

11. The connector according to claim 1, wherein said first connector's opening defines three rectangular areas, said three rectangular areas being contiguous and defining two sets of shoulders therebetween.

12. The connector according to claim 1, further comprising an EMI energy shielding member associated with one of said first connector and said second connector.

13. The connector according to claim 1, wherein said second connector's opening defines three rectangular areas, said three rectangular areas being contiguous and defining two sets of shoulders therebetween.

14. The connector according to claim 13, wherein said two sets of shoulders face in substantially opposite directions.

15. A method of using an electrical connector comprising:
providing a connector according to claim 1;
attaching a first mating electrical connector to said first connector;
attaching a second mating electrical connector to said second connector, said first mating electrical connector and said second mating electrical connector extending from said front face;
conducting a first electrical signal through said first mating electrical connector to said first connector;
conducting a second electrical signal through said second mating electrical connector to said second connector.

16. The method according to claim 15, wherein the step of conducting said first electrical signal and the step of conducting said second electrical signal are substantially simultaneously performed.

17. The method according to claim 15, wherein the step of conducting said first electrical signal further comprises conducting a signal selected from the group consisting of a voice signal and a data signal, and wherein the step of conducting said second electrical signal further comprises conducting a data signal.

* * * * *